US008341363B2

(12) United States Patent
Chou et al.

(10) Patent No.: US 8,341,363 B2

(45) Date of Patent: Dec. 25, 2012

(54) EFFICIENT CLOUD NETWORK ATTACHED STORAGE

(75) Inventors: Randy Yen-pang Chou, San Jose, CA (US); Ravi Mulam, San Jose, CA (US); Steve Jung, San Jose, CA (US)

(73) Assignee: Panzura, Inc., San Jose, CA (US)

( * ) Notice: Subject to any disclaimer, the term of this patent is extended or adjusted under 35 U.S.C. 154(b) by 216 days.

(21) Appl. No.: 12/772,927

(22) Filed: May 3, 2010

(65) Prior Publication Data

US 2011/0271067 A1 Nov. 3, 2011

(51) Int. Cl.

*G06F 13/00* (2006.01)

*G06F 13/28* (2006.01)

(52) U.S. Cl. ................ 711/162; 711/E12.103; 707/640; 707/694

(58) Field of Classification Search .................. 711/162, 711/E12.103; 707/640, 694

See application file for complete search history.

(56) References Cited

U.S. PATENT DOCUMENTS

2007/0198613 A1* 8/2007 Prahlad et al. ................ 707/204
2007/0288525 A1* 12/2007 Stakutis et al. ............... 707/200
2010/0100698 A1* 4/2010 Yang et al. .................... 711/162
2010/0114832 A1* 5/2010 Lillibridge et al. ........... 707/649
2010/0325377 A1* 12/2010 Lango et al. .................. 711/162
2011/0276713 A1* 11/2011 Brand .......................... 709/232

* cited by examiner

*Primary Examiner* — Edward Dudek, Jr.

(74) *Attorney, Agent, or Firm* — Park, Vaughan, Fleming & Dowler LLP

(57) ABSTRACT

Snapshots of data and metadata associated with the data are created. The snapshot of the data is separate from the snapshot of the associated metadata. The snapshot of metadata is maintained locally in a cloud network attached storage (NAS) and globally. The snapshot of data is maintained according to an accessibility metric.

Snapshot of metadata is transmitted from a backup remote site to a cloud network attached storage (NAS). A request for data corresponding to the metadata is received from the cloud NAS. The requested data is not available at the cloud NAS. The requested data is transmitted from the backup site to the cloud NAS.

26 Claims, 7 Drawing Sheets

EFFICIENT CLOUD NETWORK ATTACHED STORAGE

TECHNICAL FIELD

The presently disclosed embodiments are directed to the field of network, and more specifically, to network storage.

BACKGROUND

Demands in high performance and high availability applications in enterprise environments have created many opportunities in cloud computing. Some of the largest companies started realizing that their economies of scale help them create infrastructure at a fraction of the cost, both in capital expenditures and operational expenditures, of traditional enterprise infrastructure. At first the infrastructure was very unreliable and difficult to use unless a specific application was built for it, but recently, large service providers have offered infrastructure in the cloud that required only a few changes in the application. One part of the infrastructure that provides a large amount of savings is storage. The cloud storage allows companies to slightly modify their applications that functioned well in high latency, high bandwidth, and high reliability. The cloud storage also allows companies to make use of such storage for backup, archival, and disaster recovery.

Unfortunately each and every application still has to change, plus applications with low latency requirements may not take advantage of this which limits its use.

SUMMARY

One disclosed feature of the embodiments includes techniques for a cloud network attached storage (NAS). Snapshots of data and metadata associated with the data are created. The snapshot of the data is separate from the snapshot of the associated metadata. The snapshot of metadata is maintained locally in a cloud network attached storage (NAS) and globally. The snapshot of data is maintained according to an accessibility metric.

Another disclosed feature of the embodiments is a data recovery technique. Snapshot of metadata is transmitted from a backup remote site to a cloud network attached storage (NAS). A request for data corresponding to the metadata is received from the cloud NAS. The requested data is not available at the cloud NAS. The requested data is transmitted from the backup site to the cloud NAS.

BRIEF DESCRIPTION OF THE DRAWINGS

Embodiments may best be understood by referring to the following description and accompanying drawings that are used to illustrate embodiments of the invention. In the drawings.

DETAILED DESCRIPTION

One disclosed feature of the embodiments includes techniques for a cloud network attached storage (NAS). Snapshots of data and metadata associated with the data are created. The snapshot of the data is separate from the snapshot of the associated metadata. The snapshot of metadata is maintained locally in a cloud network attached storage (NAS) and globally, such as over at least one other cloud NAS, or globally over a cloud provider storage, or both. The cloud NAS does not have to be present in the cloud provider storage. The snapshot of data is maintained according to an accessibility metric. Part of the data may be on the NAS and part of the data may be on a cloud storage.

Another disclosed feature of the embodiments is a data recovery technique. Snapshot of metadata is transmitted from a backup remote site to a cloud network attached storage (NAS). A request for data corresponding to the metadata is received from the NAS. The requested data is not available at the NAS. The requested data is transmitted from the backup site to the cloud NAS.

In the following description, numerous specific details are set forth. However, it is understood that embodiments of the invention may be practiced without these specific details. In other instances, well-known circuits, structures, and techniques have not been shown to avoid obscuring the understanding of this description.

One disclosed feature of the embodiments may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc. One embodiment may be described by a schematic drawing depicting a physical structure. It is understood that the schematic drawing illustrates the basic concept and may not be scaled or depict the structure in exact proportions.

Figure 1:
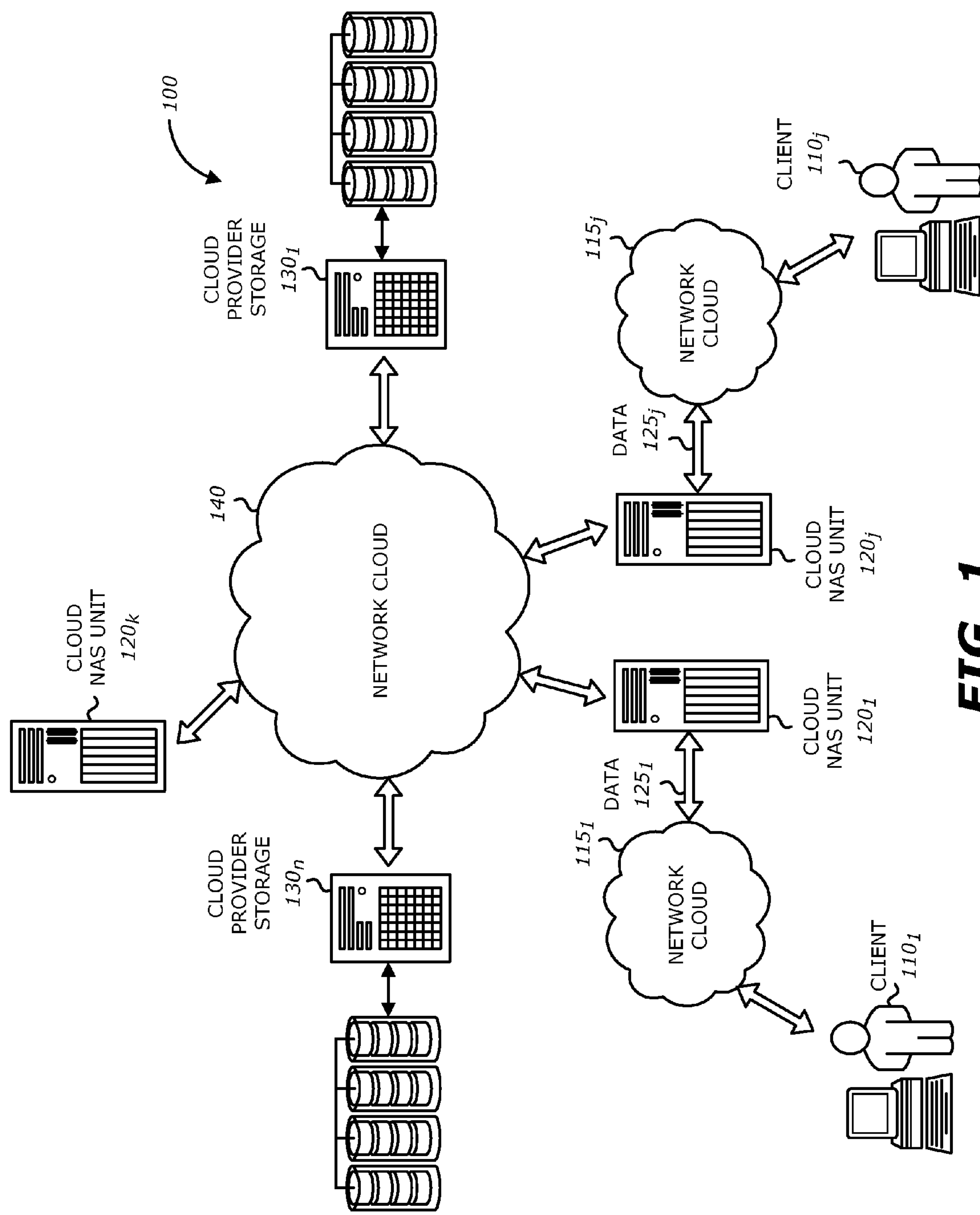
FIG. 1 is a diagram illustrating a system according to one embodiment.

FIG. 1 is a diagram illustrating a system 100 according to one embodiment. The system 100 includes clients $\mathbf{110}_1$ and $\mathbf{110}_j$, network clouds $\mathbf{115}_1$, $\mathbf{115}_j$, and 140, cloud NAS units $\mathbf{120}_1$, $\mathbf{120}_1$, and $\mathbf{120}_k$, and cloud provider storage $\mathbf{130}_1$ and $\mathbf{130}_n$. The system 100 may include more or less than the above components.

The clients $\mathbf{110}_1$ and $\mathbf{110}_j$ may be any computing clients in a typical client—server configuration. They may represent computing processing units that have ability to access network clouds $\mathbf{115}_1$, $\mathbf{115}_j$, and 140. Examples of clients $\mathbf{110}_1$ and $\mathbf{110}_j$ may include personal computers, personal digital assistant (PDA), mobile devices (e.g., cell phones, mobile computers). The connectivity may be wired or wireless. The clients $\mathbf{110}_1$ and $\mathbf{110}_j$ may transfer or receive data $\mathbf{125}_{1,j}$ to or from the cloud NAS units $\mathbf{120}_1$ and $\mathbf{120}_j$.

The network clouds $\mathbf{115}_1$, $\mathbf{115}_j$, and 140 may be any network clouds that provide network connectivity. They may include local area network, wide area network, intranet, or the Internet. The cloud connectivity may be wired or wireless including radio frequency (RF), infrared, or electromagnetic connectivity. The network clouds may be localized or global with accessibility around the globe.

The cloud NAS units 120$_{1l}$, 120$_j$, and 120$_k$ may be units having cloud NAS. The cloud may be connected to the network clouds via any available network connectivity such as wired or wireless. The storage capacity of the cloud NAS unit may be large, ranging from a few Gigabytes (GBs) or TeraByte (TBs).

The cloud provider storage 130$_1$ and 130$_n$ may be any remote storage systems provided by a cloud provider. The cloud provider may be a third party service provider or a site that belongs to the enterprise that uses the system 100 (e.g., for data recovery applications). Examples of the cloud provider storage 130$_1$ and 130$_n$ may include Amazon S3 (Simple Storage Service), Microsoft Windows Azure Data Storage, and Google Apps (Application Engine). Typically the cloud provider storage 130$_1$ and 130$_n$ provide virtually unlimited storage capacity. The cloud provider storage 130$_1$ and 130$_n$ may include one or more servers and extremely large storage subsystems (e.g., RAIDs level 5/6/10).

One aspect of embodiments is the separation of metadata and data. The metadata represent any information that is not the data. For example, suppose the data is a document. The metadata may include the title, the author, the word count, the ownership, the revision history, the encryption, etc. of the document. The metadata may include a data structure that represents the organization of the data or the various files contained in the data. The metadata, therefore, may be useful for a client user to perform high-level tasks such as browsing through a database, a file system, a document structure, etc. The size of the metadata is typically much less than the data. By separating the metadata and the data and transmitting them separately, the system can provide fast transmission of useful information for quick access. For example, the system may transmit only the metadata to all users so that all users can have access to the high level information of the data. When a user decides to access a particular data based on the metadata, such a request can then be provided by sending the actual data.

The system 100 may represent a typical cloud computing environment where a client may access data storage anywhere in the world. It may also represent a data recovery environment where a backup site is maintained to provide backup data during local system failure or disaster. In a typical disaster environment, a local data center may be collapsed due to a disaster such as earthquake, flood, or fire. The entire data storage at the local facility becomes unusable. The remote backup site may have backed up all the data and may restore the data to the local data center. However, the amount of data storage may be extremely large and such a data restoration or recovery may not take place fast enough. A delay of several hours or days may cause serious disruption to the business of the enterprise. As an example, suppose the cloud NAS unit 120$_1$ is in failure due to disaster and cannot be used. A user has to boot up a new cloud NAS unit 120$_k$ which does not have all the necessary backed up data. Suppose the cloud provider storage 130$_1$ is a backup remote site which has all the backed up data. The backup remote site may send the metadata to the new local site, the new cloud NAS unit 120$_k$, so that the user can obtain high level information that enables the user to work. Since the metadata size is typically small, the remote backup site, the cloud provider 130$_1$, can send the metadata through the network cloud very quickly, e.g., in the order of seconds or minutes. Examples of the high level information may include a directory of files. The user may browse through the directory and examine the file structures or the edit history before making a decision to request a particular piece of data or file. When the user requests a particular file, the remote backup site can send that particular requested file to the user immediately. Thus, instead of sending the entire backed up data, the remote backup site sends only the requested data on demand during the recovery period. Since the requested data typically has small size, the recovery can take place very quickly, resulting in an efficient restoration of normal operations for the enterprise. In the mean time, the entire data recovery can proceed with the normal recovery methods.

Figure 2:
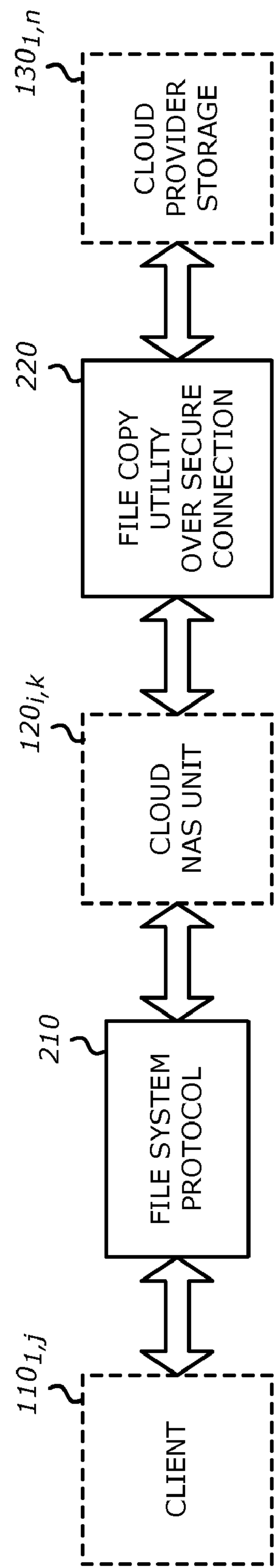
FIG. 2 is a diagram illustrating communication protocols used in the system according to one embodiment.

FIG. 2 is a diagram illustrating communication protocols used in the system 100 shown in FIG. 1 according to one embodiment. The communication protocols among the various components in the system 100 may be any protocols available for communication in cloud environment.

The protocol between the client 110$_{1,j}$ and the cloud NAS units 120$_1$, 120$_1$, and 120$_k$ may be a file systems protocol 210. Any suitable file system protocols may be used. Examples may include Network File System (NFS) and Common Internet File System (CIFS). The protocol between the cloud NAS units 120$_1$, 120$_1$, and 120$_k$ and the cloud provider storage 130$_1$ and 130$_n$ may be any file systems protocol as above, or a file copy utility over secure connection 220 such as the rsync over SSH (Secure Shell) or compatible protocol.

Figure 3:
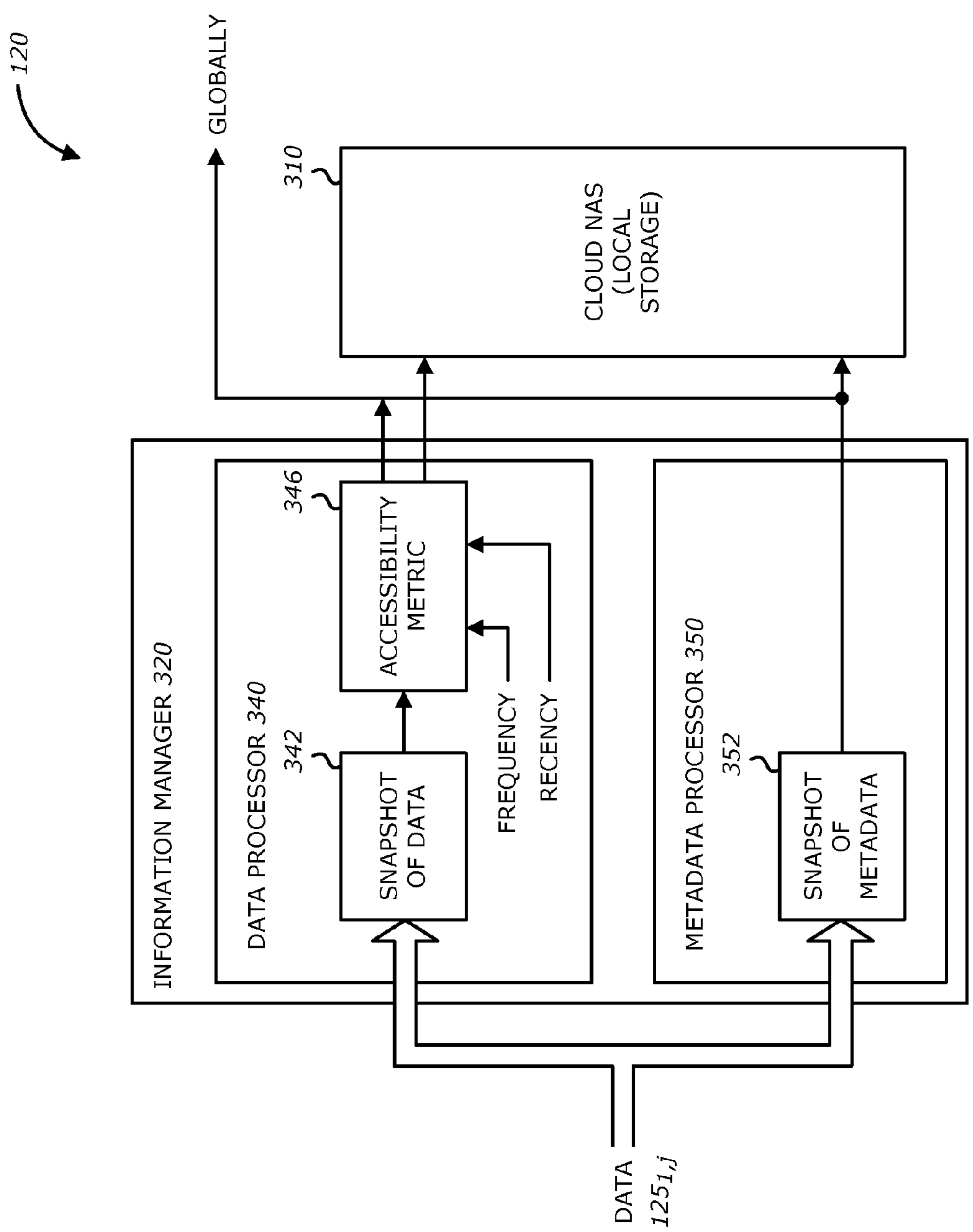
FIG. 3 is a diagram illustrating a cloud network attached storage (NAS) unit according to one embodiment.

FIG. 3 is a diagram illustrating a cloud network attached storage (NAS) unit 120 shown in FIG. 1 according to one embodiment. For brevity, the subscripts are dropped. The cloud NAS unit 120 may include a cloud NAS 310 and an information manager 320. The cloud NAS unit 120 may include more or less components than above.

The cloud NAS 310 represents a local storage device in the cloud NAS unit 120. It may be any storage device (e.g., disk) that is accessible via a network cloud. It may include redundant array of inexpensive/independent disks (RAIDs) at any suitable levels (e.g., 5/6/10). It may contain data that are cached for fast access. The cloud NAS 310 may have any suitable protocols. Examples may include file-based protocols such as NFS (e.g., UNIX systems), SMB/CIFS (Server Message Block/Common Internet File System) (e.g., Microsoft Windows systems), or AFP (Apple Filing Protocol with Apple Macintosh computers). The cloud NAS 310 may be a single unit or a clustered unit running on multiple servers.

The information manager 320 may be any computing processing system. It may be implemented by hardware, firmware or software or any combination of them. It may be coupled to the cloud NAS 310 via any suitable connectivity. It may receive/transmit data 125$_{1,j}$ from/to the clients 110$_1$ and 110$_j$ and cloud provider storage 130$_{1,n}$ via the network clouds 115$_1$, 115$_j$, and 140. It may include a data processor 340 and a metadata processor 350. Note that the information manager 320 may include more or less than the above processors.

The data processor 340 may process a snapshot of data 342 using an accessibility metric 346. The data processor may keep the data locally in the cloud NAS 310 if the data satisfies the accessibility metric 346. It may transmit the data to the cloud provider storage via the network cloud 130$_{1,n}$ if the data does not satisfy the accessibilitymetric 346. The accessibility metric 346 may be associated with the data, or a block or chunk of data, and represents a metric, ranking, index, or figure of merit that represents the criterion or criteria to keep the data locally for fast access. It may be related to at least one of frequency of access and recency of access. The frequency of access refers to how often the data has been accessed. The recency of access refers to how recently the data has been accessed. A high frequency of access of a block or chunk of data may indicate that the data is useful and may be requested often in the future. Similarly, a high recency of access (indicating the data is most recently accessed) of a block or chunk of data may indicate that the data may be accessed again in the future. Therefore, it may be advantageous to store the data with high frequency or recency of access locally in the cloud NAS 310. The accessibility metric 346 may be based on only the frequency of access, only the recency of access, or a combination of both. Any useful permutations may be performed. For example, a linear combination of frequency and recency may be used with appropriate weight factors. The accessibility metric 346 may be updated each time the data (or a block/chunk of data) is accessed to reflect the characteristics of the data. The data processor 340 keeps track of the accessibility metric 346 for a unit of data (e.g., file, block, chunk) of fixed or variable size to decide whether the unit of data should be kept locally in the cloud NAS 310 or sent globally such as to other several cloud NASes or to the cloud provider storage $\mathbf{130}_{1,n}$, or both. The satisfiability of the accessibility metric 346 may be based on a ranking of the metrics or based on a comparison with a static or dynamic threshold value. The data processor 340 keeps a record of accesses of the data in terms of frequency and recency and provides a ranking each time a decision to keep or to send a block of data needs to be made. By using the accessibility metric, the data processor 340 keeps the amount of storage in the local NAS 310 at a reasonable size.

The metadata processor 350 may process a snapshot of metadata 352 associated with the data or the snapshot of data 342. The metadata are separated from the data. As discussed above, this separation of metadata and data provides an efficient data transmission. The metadata processor 350 may keep the snapshot of metadata 352 in the cloud NAS 310 and transmit the snapshot of metadata 352 to the cloud provider storage via the network cloud without regard to the accessibility metric 346. In other words, the snapshot of metadata 352 is kept locally and sent to all users of the system. Since the size of the metadata is typically very small, the transmission of the metadata would not take up much communication bandwidth and therefore may be transmitted with high frequency. In addition, the snapshot of metadata 352 may represent the incremental metadata, or the part of the metadata that is the difference between the new metadata and the existing or already stored metadata. This may even further reduce the size of the metadata.

Figure 4:
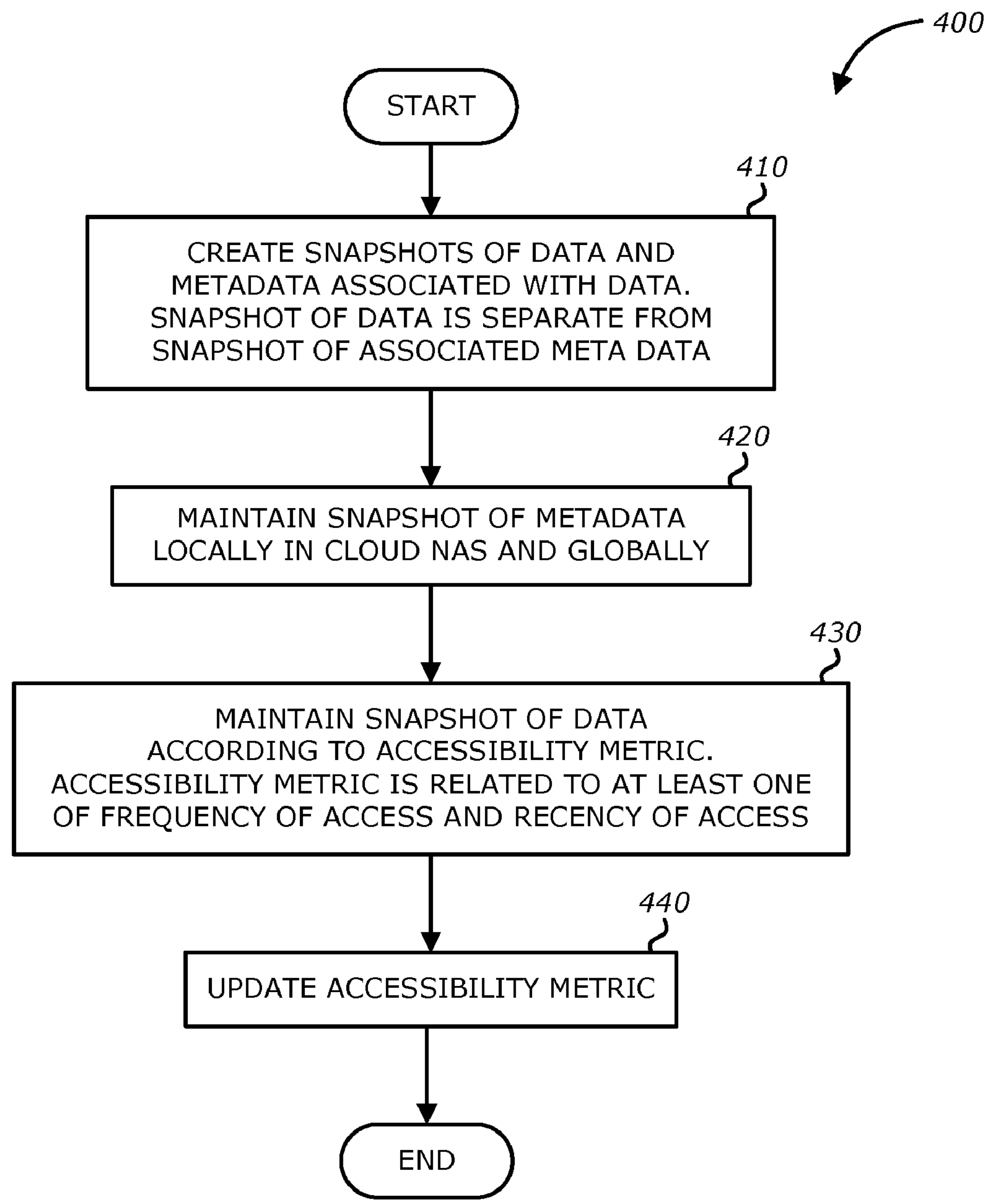
FIG. 4 is a diagram illustrating a process to manage information in the cloud NAS unit according to one embodiment.

FIG. 4 is a diagram illustrating a process 400 to manage information in the cloud NAS unit according to one embodiment.

Upon START, the process 400 creates snapshots of data and metadata associated with the data (Block 410). The snapshot of the data is separate from the snapshot of the associated metadata. The snapshots of data or metadata represent the information that is captured at the time of transmission or storage. The information may represent the fresh new information or the incremental information. Next, the process 400 maintains the snapshot of metadata locally in a cloud network attached storage (NAS) and globally, such as over at least one other cloud NAS, typically several cloud NASes, or globally over a cloud provider storage, or both (Block 420). The cloud NAS does not have to be present in the cloud provider storage. Then, the process 400 maintains the snapshot of data according to an accessibility metric (Block 430). The accessibility metric represents a criterion or index that indicates the desirability of the data to be accessed in the future. A block of data that has a high accessibility metric will be retained or kept locally at the cloud NAS. Data having a low metric will be streamed into the cloud, or sent to the cloud provider storage to avoid taking up space in the local NAS. Next, the process 400 updates the accessibility metric (Block 440). The update of the accessibility metric is based on the specified criteria. For example, if the criteria is the recency of access, then the block of data that has just been accessed will be marked with high recency of access.

Figure 5:
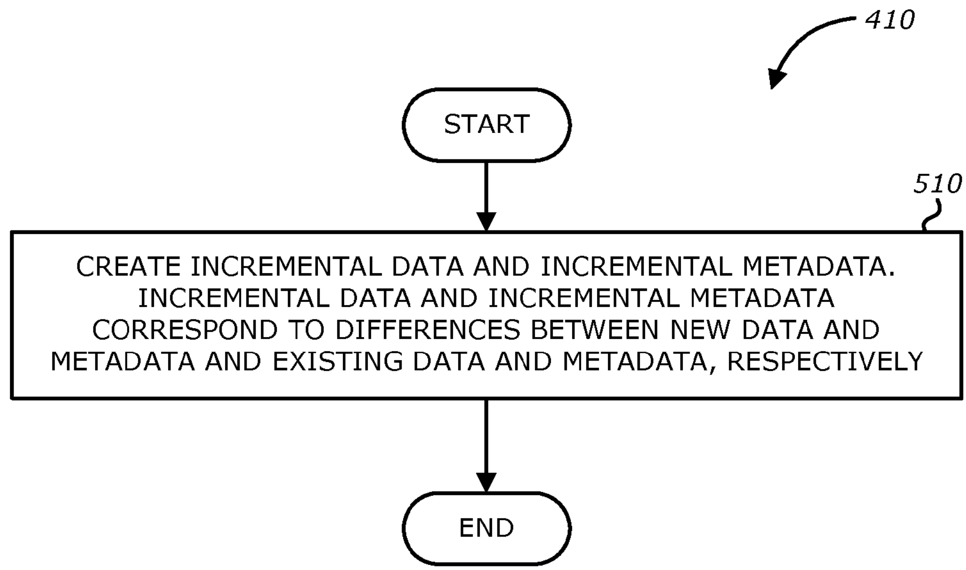
FIG. 5 is a diagram illustrating a process to create snapshots of data and metadata according to one embodiment.

FIG. 5 is a diagram illustrating the process 410 shown in FIG. 4 to create snapshots of data and metadata according to one embodiment.

Upon START, the process 410 creates incremental data and incremental metadata (Block 510). The incremental data and incremental metadata correspond to differences between new data and metadata and existing data and metadata, respectively. The process 410 is then terminated.

Figure 6:
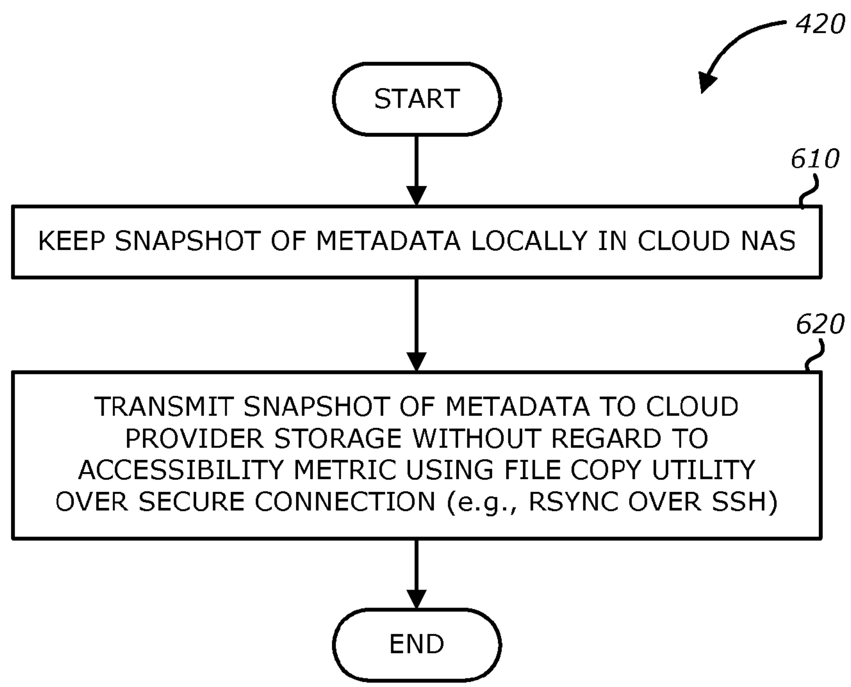
FIG. 6 is a diagram illustrating a process to maintain a snapshot of metadata according to one embodiment.

FIG. 6 is a diagram illustrating the process 420 shown in FIG. 4 to maintain a snapshot of metadata according to one embodiment.

Upon START, the process 420 keeps a snapshot of metadata locally in cloud NAS (Block 610). Next, the process 420 transmits a snapshot of metadata to a cloud provider storage without regard to accessibility metric (Block 620). The transmission may be carried out by using a file copy utility over secure connection (e.g., rsync over SSH). In other words, all users of the storage on the cloud receive the metadata. Since the metadata size is typically small, its transmission does not take up much communication bandwidth and its storage does not take up much local space. The process 420 is then terminated.

Figure 7:
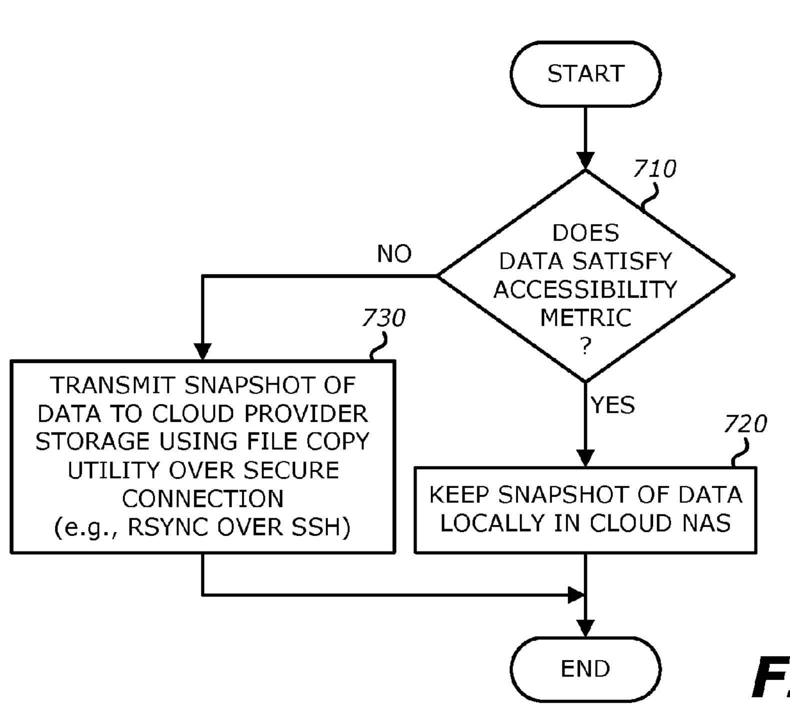
FIG. 7 is a diagram illustrating a process to maintain a snapshot of data according to one embodiment.

FIG. 7 is a diagram illustrating the process 430 shown in FIG. 4 to maintain a snapshot of data according to one embodiment.

Upon START, the process 430 determines if the data satisfies the accessibility metric (Block 710). If so, the process 430 keeps the snapshot of data locally in cloud NAS (Block 720). As discussed above, satisfying the accessibility metric indicates that the corresponding block of data has a high likelihood to be accessed again in the future. The local cloud NAS therefore caches this block of data so that future accesses may find it instantly in the local storage rather than having to wait for the requested data to be sent from the cloud provider storage. If the data does not satisfy the accessibility metric, the process 430 transmits the snapshot of data to the cloud provider storage (Block 730). The transmission may be carried out by using a file copy utility over secure connection (e.g., rsync over SSH). The snapshot of the data may represent the incremental data, or the difference between the new data and the existing data that has been stored. This will reduce further the size of the data to be transmitted or stored. The process 430 is then terminated.

Figure 8:
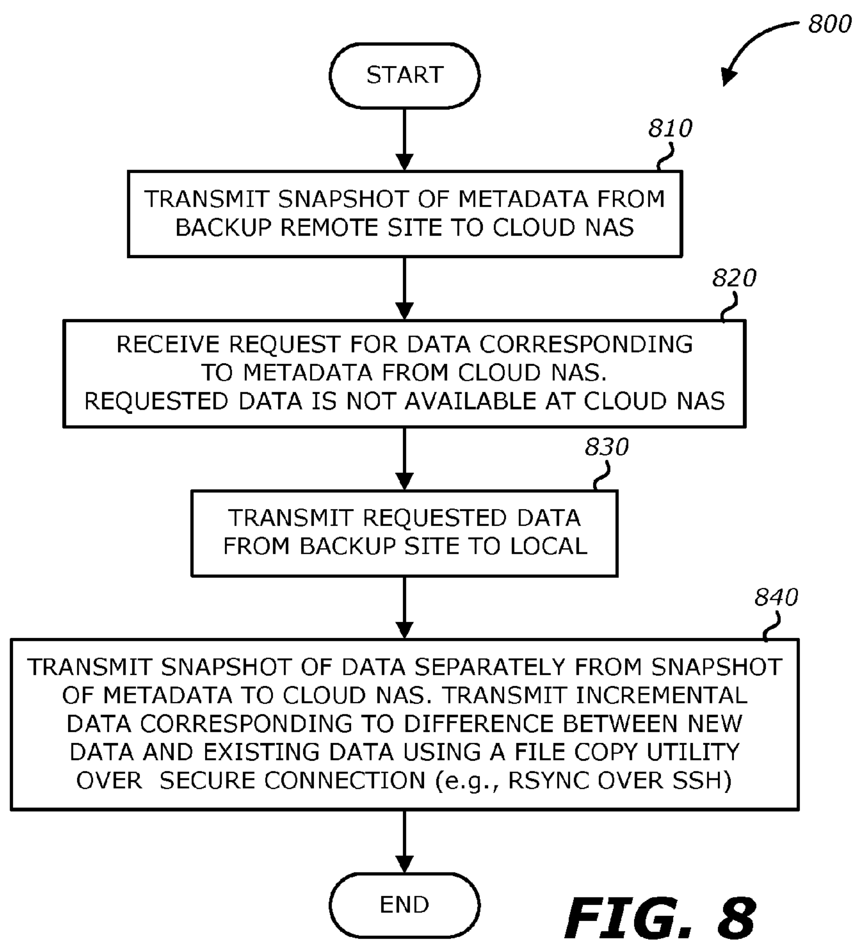
FIG. 8 is a diagram illustrating a process to provide backup information according to one embodiment.

FIG. 8 is a diagram illustrating a process 800 to provide backup information according to one embodiment. This process may be used when the system 100 is configured in a backup scenario where a backup site provides the backup data to a cloud NAS.

Upon START, the process 800 transmits a snapshot of metadata from a backup remote site to a cloud NAS (Block 810). In this scenario, it is assumed that the cloud NAS is a new NAS which does not have the backed up data and metadata. It is a local cloud NAS. Next, the process 800 receives a request for data corresponding to the metadata from the cloud NAS (Block 820). The requested data is not available at the cloud NAS. In this scenario, the user may use the metadata and attempts to access the data from the metadata, but since the backed up data has not been sent to the new cloud NAS yet, it is not available.

Then, the process 800 transmits the requested data from the backup site to the cloud NAS (Block 830). Next, the process 800 transmits a snapshot of data separately from the snapshot of metadata to the cloud NAS (Block 840). This is to proceed with the normal recovery process. Other recovery methods may be used without sending the data and metadata over the cloud. The process 800 may transmit incremental data corresponding to difference between new data and existing data. Then, the process 800 is terminated.

Figure 9:
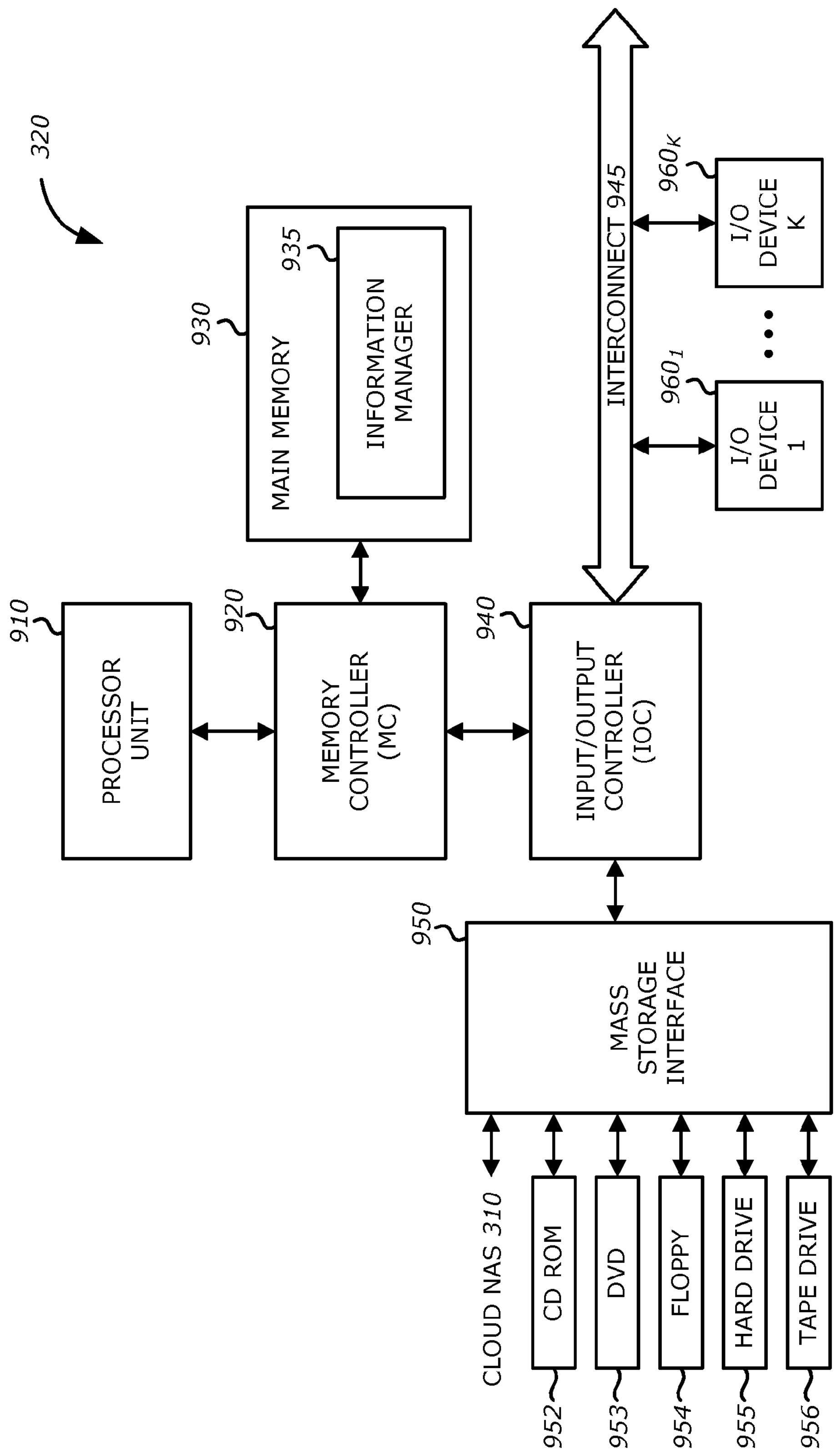
FIG. 9 is a diagram illustrating a processing system for the information manager according to one embodiment.

FIG. 9 is a diagram illustrating a processing system for the information manager 320 shown in FIG. 3 according to one embodiment The processing system 320 includes a processor unit 910, a memory controller (MC) 920, a main memory 930, an input/output controller (IOC) 940, an interconnect 945, a mass storage interface 950, and input/output (I/O) devices $\mathbf{960}_1$ to $\mathbf{960}_K$. The processing system 320 may include more or less of the above components.

The processor unit 910 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 920 provides control and configuration of memory and input/output devices such as the main memory 930 and the IOC 940. The MC 920 may be integrated into a chipset that integrates multiple functionalities such as graphics, media, host-to-peripheral bus interface, memory control, power management, etc.

The main memory 930 stores system code and data. The main memory 930 is typically implemented with dynamic random access memory (DRAM), static random access memory (SRAM), or any other types of memories including those that do not need to be refreshed. The main memory 930 may include multiple channels of memory devices such as DRAMs. The main memory 930 may contain the information manager module 935 that performs part of or all the functions of the information manager 320 as discussed above.

The IOC 940 has a number of functionalities that are designed to support I/O functions. The IOC 940 may also be integrated into a chipset together or separate from the MC 920 to perform I/O functions. The IOC 940 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 945 provides interface to peripheral devices. The interconnect 945 may be point-to-point or connected to multiple devices. For clarity, not all interconnects are shown. It is contemplated that the interconnect 945 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 950 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 952, digital video/versatile disc (DVD) 953, floppy drive 954, hard drive 955, tape drive 956, the cloud NAS 310, and any other magnetic or optic storage devices. The mass storage device provides a mechanism to read machine-accessible media.

The I/O devices $\mathbf{960}_1$ to $\mathbf{960}_K$ may include any I/O devices to perform I/O functions. Examples of I/O devices $\mathbf{960}_1$ to $\mathbf{960}_K$ include controller for input devices (e.g., keyboard, mouse, trackball, pointing device), media card (e.g., audio, video, graphic), and any other peripheral controllers. The I/O devices $\mathbf{960}_1$ to $\mathbf{960}_K$ may also include network interface card or devices that connect to the network cloud $\mathbf{115}_1$, $\mathbf{115}_j$, and 140 shown in FIG. 1.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory; ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:

receiving a request from a client to update data on a cloud network attached (NAS) device, wherein the cloud NAS device is part of a federation of two or more cloud NAS devices, wherein the federation of cloud NAS devices further comprises one or more cloud provider storage devices that store data for the cloud NAS devices;

creating on the cloud NAS device snapshots of data and metadata associated with the updated data, the snapshot of the data being separate from the snapshot of the associated metadata;

propagating the snapshot of metadata to all other devices in the federation wherein periodic exchanges of snapshots of metadata ensure that each device in the federation stores metadata for all of the data stored in the federation;

determining based on an accessibility metric whether to maintain the updated data in the cloud NAS device; and determining based on the accessibility metric whether to transfer the snapshot of data to at least one of the additional cloud NAS devices and the one or more cloud provider storage devices.

2. The method of claim 1 wherein creating comprises:

creating an incremental data and an incremental metadata, the incremental data and incremental metadata corresponding to differences between new data and metadata and existing data and metadata, respectively.

3. The method of claim 1 wherein propagating the snapshot of metadata comprises:

keeping the snapshot of metadata locally in the cloud NAS device; and transmitting the snapshot of metadata to a cloud provider storage device without regard to the accessibility metric.

4. The method of claim 1 wherein determining whether to maintain the updated data in the cloud NAS device further comprises:

keeping the updated data locally in the cloud NAS device if the updated data satisfies the accessibility metric; and transmitting the snapshot of data to the cloud provider storage and removing the updated data from the cloud NAS device if the updated data does not satisfy the accessibility metric.

5. The method of claim 1:

wherein the accessibility metric is related to at least one of frequency of access and recency of access; and wherein the method further comprises updating the accessibility metric based on at least one of the frequency of access and the recency of access for the updated data.

6. The method of claim 1, wherein an additional cloud NAS device is added to the federation;

wherein during a recovery period the additional cloud NAS device is configured to receive the metadata for all of the data in the federation from at least one of the additional cloud NAS devices and/or the one or more cloud provider storage devices prior to receiving data from the federation;

wherein during the recovery period a second client accessing the additional cloud NAS device uses the received metadata to formulate a second request; and wherein upon receiving the second request during the recovery period, the additional cloud NAS is configured to contact at least one of the additional cloud NAS devices and/or the one or more cloud provider storage devices to retrieve data associated with the second request.

7. The method of claim 3 wherein transmitting the snapshot of metadata comprises:

transmitting the snapshot of metadata using a file copy utility over a secure connection.

8. The method of claim 4 wherein transmitting the snapshot of data comprises:

transmitting the snapshot of data using a file copy utility over a secure connection.

9. A method comprising:

transmitting a snapshot of metadata from a backup remote site to a cloud network attached storage (NAS) device during a recovery period, wherein the cloud NAS device is joining a federation of one or more cloud NAS devices, wherein the federation of cloud NAS devices further comprises one or more cloud provider storage devices that store data for the cloud NAS devices, wherein the backup remote site is at least one of the one or more cloud NAS devices and/or the one or more cloud provider storage devices in the federation, wherein each cloud NAS device in the federation periodically propagates snapshots of updated metadata to all of the federation to ensure that each device in the federation stores metadata for all of the data stored in the federation, wherein during the recovery period the cloud NAS device is configured to receive the metadata for all of the data in the federation from at least one of the one or more cloud NAS devices and/or the one or more cloud provider storage devices prior to receiving data from the federation, wherein the cloud NAS device receives a request from a client for data corresponding to the transmitted metadata, wherein the request is received during the recovery period, wherein the requested data is not available at the cloud NAS device, wherein the cloud NAS device is configured to contact at least one of the one or more cloud NAS devices and/or the one or more cloud provider storage devices to retrieve data associated with the request; and transmitting the requested data from the federation to the cloud NAS device.

10. The method of claim 9 further comprising:

transmitting a snapshot of data separately from the snapshot of metadata to the cloud NAS device.

11. The method of claim 10 wherein transmitting the snapshot of data comprises:

transmitting incremental data corresponding to difference between new data and existing data.

12. The method of claim 11 wherein transmitting incremental data comprises:

transmitting incremental data using a file copy utility over a secure connection.

13. A system comprising:

a cloud network attached storage (NAS) device coupled to a network cloud, wherein the cloud NAS device is part of a federation of two or more cloud NAS devices, wherein the federation of cloud NAS devices further comprises one or more cloud provider storage devices that store data for the cloud NAS devices; and an information manager coupled to the cloud NAS device comprising:

a data processor, and a metadata processor;

wherein, upon receiving a request from a client to update data in the cloud NAS device:

the metadata processor is configured to propagate a snapshot of metadata to all other devices in the federation, wherein periodic exchanges of snapshots of metadata ensure that each device in the federation stores metadata for all of the data stored in the federation;

the data processor is configured to determine based on an accessibility metric whether to maintain the updated data in the cloud NAS device;

the data processor is further configured to determine based on the accessibility metric whether to transfer the snapshot of data to at least one of the additional cloud NAS devices and the one or more cloud provider storage devices.

14. The system of claim 13 wherein the snapshot of data includes incremental data corresponding to difference between new data and existing data.

15. The system of claim 13 wherein the snapshot of metadata includes incremental metadata corresponding to difference between new metadata and existing metadata.

16. The system of claim 13 wherein the data processor updates the accessibility metric according to at least one of frequency of access and recency of access.

17. A system comprising:

a client;

a cloud provider storage device; and a cloud network attached storage (NAS) device coupled to the client and the cloud provider storage via a network cloud, wherein the cloud NAS device is part of a federation of two or more cloud NAS devices, wherein the federation of cloud NAS devices further comprises the cloud provider storage device, wherein the cloud provider storage device stores data for the cloud NAS devices; the cloud NAS device comprising:

a cloud NAS, and an information manager coupled to the cloud NAS comprising:

a data processor, and a metadata processor;

wherein, upon receiving a request from the client to update data in the cloud NAS:

the metadata processor is configured to propagate a snapshot of metadata to all other devices in the federation via the network cloud, wherein periodic exchanges of snapshots of metadata ensure that each cloud NAS device and each cloud provider storage device in the federation stores metadata for all of the data stored in the federation;

the data processor is configured to determine based on an accessibility metric whether to maintain the updated data in the cloud NAS device;

the data processor is further configured to determine based on the accessibility metric whether to transfer the snapshot of data to at least one of the additional cloud NAS devices and the one or more cloud provider storage devices via the network cloud.

18. The system of claim 17 wherein the client communicates with the cloud NAS device using a file system protocol.

19. The system of claim 17 wherein the data processor updates the accessibility metric according to at least one of frequency of access and recency of access.

20. The system of claim 17 wherein the cloud NAS device communicates with the cloud provider storage using a file copy utility over a secure connection.

21. An article of manufacture comprising:

a non-transitory machine-accessible medium including data that, when accessed by a machine, causes the machine to perform operations comprising:

receiving a request from a client to update data on a cloud network attached (NAS) device, wherein the cloud NAS device is part of a federation of two or more cloud NAS devices, wherein the federation of cloud NAS devices further comprises one or more cloud provider storage devices that store data for the cloud NAS devices;

creating on the cloud NAS device snapshots of data and metadata associated with the updated data, the snapshot of the data being separate from the snapshot of the associated metadata;

propagating the snapshot of metadata to all other devices in the federation, wherein periodic exchanges of snapshots of metadata ensure that each device in the federation stores metadata for all of the data stored in the federation;

determining based on an accessibility metric whether to maintain the updated data in the cloud NAS device; and determining based on the accessibility metric whether to transfer the snapshot of data to at least one of the additional cloud NAS devices and the one or more cloud provider storage devices.

22. The article of manufacture of claim 21 wherein the data causing the machine to perform creating snapshots comprises data that, when executed by the machine, causes the machine to perform operations comprising:

creating an incremental data and an incremental metadata, the incremental data and incremental metadata corresponding to differences between new data and metadata and existing data and metadata, respectively.

23. The article of manufacture of claim 21 wherein the data causing the machine to perform propagating the snapshot of metadata comprises data that, when executed by the machine, causes the machine to perform operations comprising:

keeping the snapshot of metadata locally in the cloud NAS device; and transmitting the snapshot of metadata to a cloud provider storage device without regard to the accessibility metric.

24. The article of manufacture of claim 21 wherein the data causing the machine to determine whether to maintain the updated data in the cloud NAS device further comprises data that, when executed by the machine, causes the machine to perform operations comprising:

keeping the updated data locally in the cloud NAS device if the updated data satisfies the accessibility metric; and transmitting the snapshot of data to the cloud provider storage and removing the updated data from the cloud NAS device if the updated data does not satisfy the accessibility metric.

25. The article of manufacture of claim 21 wherein the data further comprises data that, when accessed by a machine, causes the machine to perform operations comprising:

updating the accessibility metric.

26. An article of manufacture comprising:

a non-transitory machine-accessible medium including data that, when accessed by a machine, causes the machine to perform operations comprising:

transmitting a snapshot of metadata from a backup remote site to a cloud network attached storage (NAS) device during a recovery period, wherein the cloud NAS device is joining a federation of one or more cloud NAS devices, wherein the federation of cloud NAS devices further comprises one or more cloud provider storage devices that store data for the cloud NAS devices, wherein the backup remote site is at least one of the one or more cloud NAS devices and/or the one or more cloud provider storage devices in the federation, wherein each cloud NAS device in the federation periodically propagates snapshots of updated metadata to all of the federation to ensure that each cloud NAS device and each cloud provider storage device in the federation stores metadata for all of the data stored in the federation, wherein during the recovery period the cloud NAS device is configured to retrieve the metadata for all of the data in the federation from at least one of the one or more cloud NAS devices and/or the one or more cloud provider storage devices of the federation prior to receiving data from the federation, wherein the cloud NAS device receives a request from a client for data corresponding to the transmitted metadata , wherein the request is received during the recovery period, wherein the requested data is not available at the cloud NAS device, wherein the cloud NAS device is configured to contact at least one of the one or more cloud NAS devices and/or the one or more cloud provider storage devices in the federation to retrieve data associated with the request; and transmitting the requested data from the federation to the cloud NAS device.

* * * * *